US012572436B2

(12) United States Patent
Glass et al.

(10) Patent No.: US 12,572,436 B2
(45) Date of Patent: \*Mar. 10, 2026

(54) SYSTEM AND METHOD FOR ENHANCING THE EFFICIENCY OF MAINFRAME OPERATIONS

(71) Applicant: VirtualZ Computing Corporation, Minneapolis, MN (US)

(72) Inventors: Jeanne M. Glass, White Bear Lake, MN (US); Dustin W. Froyum, Golden Valley, MN (US); Vincent R. Re, Southport, NC (US)

(73) Assignee: VirtualZ Computing Corporation, Minneapolis, MN (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/388,066

(22) Filed: Nov. 8, 2023

(65) Prior Publication Data

US 2024/0070042 A1 Feb. 29, 2024

Related U.S. Application Data

(63) Continuation of application No. 17/544,011, filed on Dec. 7, 2021, now Pat. No. 11,841,783, which is a
(Continued)

(51) Int. Cl.
*G06F 11/07* (2006.01)
*G06F 9/38* (2018.01)
(Continued)

(52) U.S. Cl.
CPC ........ *G06F 11/3017* (2013.01); *G06F 9/3836* (2013.01); *G06F 9/4806* (2013.01);
(Continued)

(58) Field of Classification Search
CPC ............. G06F 11/3017; G06F 11/3034; G06F 11/0709; G06F 11/3684; G06F 11/3688;
(Continued)

(56) References Cited

U.S. PATENT DOCUMENTS 7,844,966 B1 11/2010 Chan
8,527,991 B2 9/2013 Hilton
(Continued)

OTHER PUBLICATIONS

Cho Cho Myint et al.; "A Framework of Using Mobile Agent to Achieve Efficient Load Balancing in Cluster"; 6th Asia-Pacific Symposium on Information and Telecommunication Technologies, Yangon, Myanmar; [Retrieved on Oct. 12, 2021]; Retrieved from the internet: <URL: https://ieeexplore.ieee.org/stamp/stamp.jsp?tp= &arnumber=1593439>; pp. 66-70; 2005.
(Continued)

*Primary Examiner* — Anibal Riveracruz
(74) *Attorney, Agent, or Firm* — Baker Botts L.L.P.

(57) ABSTRACT

A method includes monitoring a job being executed at the source mainframe. A job comprises multiple tasks. A method includes monitoring a particular task of the multiple tasks being executed at a source mainframe and determining an application required to execute the particular task. In response to determining that the particular task requires an application to execute, determining a target mainframe where the application is installed. A method further includes validating the environment of the target mainframe to confirm that the particular task can be executed using the target mainframe, and upon validating the target mainframe, redirecting the particular task to the target mainframe for execution. A method also includes monitoring the particular task being executed at the target mainframe and returning the results of the particular task from the target mainframe to the source mainframe.

18 Claims, 5 Drawing Sheets

Related U.S. Application Data continuation of application No. 16/680,963, filed on Nov. 12, 2019, now Pat. No. 11,200,131.

(51) Int. Cl.

| | |
|---|---|
| *G06F 9/46* | (2006.01) |
| *G06F 9/48* | (2006.01) |
| *G06F 9/50* | (2006.01) |
| *G06F 11/30* | (2006.01) |
| G06F 11/3668 | (2025.01) |
| G06F 16/182 | (2019.01) |
| G06F 16/25 | (2019.01) |
| G06F 16/28 | (2019.01) |
| G06F 16/9535 | (2019.01) |

(52) U.S. Cl.
CPC ........ *G06F 11/3034* (2013.01); *G06F 9/4856* (2013.01); *G06F 9/4875* (2013.01); *G06F 9/5005* (2013.01); *G06F 9/5033* (2013.01); *G06F 9/5038* (2013.01); *G06F 11/0709* (2013.01); *G06F 11/3684* (2013.01); *G06F 11/3688* (2013.01); *G06F 16/182* (2019.01); *G06F 16/254* (2019.01); *G06F 16/283* (2019.01); *G06F 16/9535* (2019.01)

(58) Field of Classification Search
CPC .... G06F 9/3836; G06F 9/4806; G06F 9/4856; G06F 9/4875; G06F 9/5005; G06F 9/5033; G06F 9/5038; G06F 16/182; G06F 16/9535; G06F 16/283; G06F 16/254
See application file for complete search history.

(56) References Cited

U.S. PATENT DOCUMENTS

| | | | |
|---|---|---|---|
| 9,342,372 | B1 | 5/2016 | Tran et al. |
| 9,389,904 | B2 | 7/2016 | Hilton |
| 10,108,459 | B2 | 10/2018 | Williams et al. |
| 10,169,077 | B1 * | 1/2019 | Sigl, Sr. ................ G06F 9/4843 |
| 10,282,690 | B1 | 5/2019 | Delfranco et al. |
| 10,394,597 | B1 * | 8/2019 | Kowalski .............. G06F 9/5072 |
| 10,509,696 | B1 * | 12/2019 | Gilderman .......... G06F 11/0727 |
| 10,579,420 | B2 | 3/2020 | Innes et al. |
| 10,713,143 | B1 * | 7/2020 | Vemulapati ........... G06F 9/5055 |
| 2006/0069717 | A1 | 3/2006 | Mamou et al. |
| 2007/0101336 | A1 * | 5/2007 | Moore ................. G06F 9/5055 |
| | | | 718/102 |
| 2008/0059946 | A1 | 3/2008 | Harding et al. |
| 2015/0046389 | A1 | 2/2015 | Dhayapule et al. |
| 2015/0052531 | A1 | 2/2015 | Helak et al. |
| 2015/0301743 | A1 * | 10/2015 | Nagao ................... G06F 3/0689 |
| | | | 711/113 |
| 2015/0370871 | A1 | 12/2015 | Bender |
| 2016/0006635 | A1 * | 1/2016 | Yokota ................ H04L 43/0888 |
| | | | 709/226 |
| 2018/0107518 | A1 * | 4/2018 | Aronovich ........... G06F 9/5005 |
| 2021/0311858 | A1 | 10/2021 | Rakhmilevich et al. |

OTHER PUBLICATIONS

Maitreya Natu et al.; "Using Analytics to Understand and Control Batch Operations—A Case Study"; 2015 IFIP/IEEE International Symposium on Integrated Network Management (IM), Ottawa, ON, Canada; [Retrieved on Jul 24, 2023]; Retrieved from the internet: <URL: https://ieeexplore.ieee.org/stamp/stamp.jsp?tp=&arnumber= 7140394>; pp. 858-861; 2015.

* cited by examiner

SYSTEM AND METHOD FOR ENHANCING THE EFFICIENCY OF MAINFRAME OPERATIONS

RELATED APPLICATIONS

This application is a Continuation of U.S. patent application Ser. No. 17/544,011, filed Dec. 7, 2021, now U.S. Pat. No. 11,841,783, issued Dec. 12, 2023; which is a Continuation of U.S. patent application Ser. No. 16/680,963, filed Nov. 12, 2019, now U.S. Pat. No. 11,200,131, issued Dec. 14, 2021, the entire contents of each of which are incorporated herein by reference.

BACKGROUND

The disclosure relates generally to mainframe operations, and more specifically to a system and method for enhancing the efficiency of mainframe operations.

BRIEF SUMMARY

According to one aspect of the present disclosure, a method includes monitoring a job being executed at the source mainframe. A job comprises multiple tasks. A method includes monitoring a particular task of the multiple tasks being executed at a source mainframe and determining an application required to execute the particular task. In response to determining that the particular task requires an application to execute, determining a target mainframe where the application is installed. A method further includes validating the environment of the target mainframe to confirm that the particular task can be executed using the target mainframe, and upon validating the target mainframe, redirecting the particular task to the target mainframe for execution. A method also includes monitoring the particular task being executed at the target mainframe and returning the results of the particular task from the target mainframe to the source mainframe.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
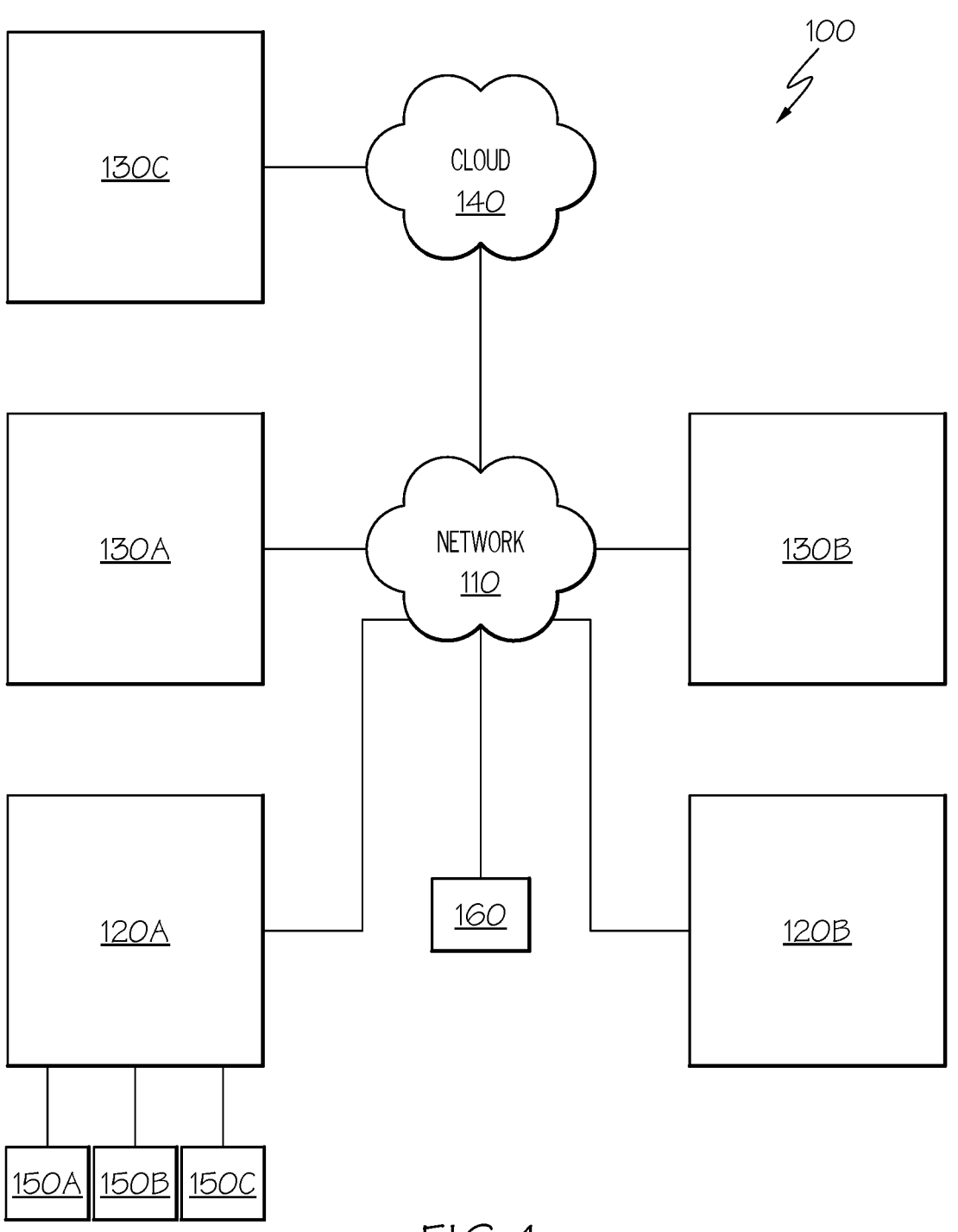
FIG. 1 illustrates a block diagram of a system for enhancing the use of mainframe application in accordance with a particular non-limiting embodiment of the present disclosure

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Moreover, any functionality described herein may be accomplished using hardware only, software only, or a combination of hardware and software in any module, component or system described herein. Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including a symbolic programming language such as Assembler, an object oriented programming language, such as JAVA®, SCALA®, SMALLTALK®, EIFFEL®, JADE®, EMERALD®, C++, C #, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Mainframes are powerful, multi-processor computers used primarily by large organizations for critical applications and bulk data processing, such as census, industry, consumer statistics, enterprise resource planning, and transaction processing. Due to the complex and sophisticated nature of mainframes, they often require corresponding complex and sophisticated software in order to run properly and efficiently. Due to these complexities, mainframes are very expensive to purchase and maintain. Moreover, continued use of the software typically requires the payment of substantial fees either annually or on a per "use" basis. The per "use" basis may measure the number of transactions, the amount of resources used over a period of time and may also take into account the number of mainframes having a particular application installed thereon.

Processing capacity of the mainframe computers is often measured in terms of millions of service units per hour (MSUs) that are used to execute tasks. Mainframe customers are often charged for their software application (application) that runs on mainframe based on peak MSU consumption (i.e., the highest amount over a certain period of time, or a predetermined period of time (certain time of day(s), certain days, certain week(s), certain month(s), etc.)).

In order to reduce or minimize costs associated with the use of mainframes, enterprises will often employ multiple people whose primary purpose is the reduce the costs of operating the mainframes, without losing much or any quality, speed or efficiency. This can be accomplished in various ways. For example, sometimes there are tasks that can be moved from a mainframe onto a traditional server or other computing device, in order to limit mainframe resources expended. In certain embodiments, tasks may be more evenly distributed amongst a plurality of mainframes within an organization, to lower the potential "peak" usage levels of one or more mainframes. In other embodiments, certain tasks can be outsourced to a third party or third parties (e.g., cloud or other service providers) that can accomplish the task using fewer resources and/or at a lower cost to the enterprise.

The systems, apparatuses, methods, and computer program products of the disclosed embodiments provide the Information Technology (IT) leaders the ability to reduce the cost of operating a mainframe(s) while maintaining performance. For example, in accordance with a particular embodiment, multiple licenses may be consolidated to one mainframe, and all tasks that require a particular license may be assigned to a particular mainframe without impacting mainframe operations. The consolidation of licenses would allow an application that requires such a license to be removed from the other mainframes (substantially reducing cost) that may previously have been assigned to such tasks. Thus enterprises can reduce or avoid instances in which they are required to pay for (e.g., license) applications on every mainframe or more than one mainframe, when a single mainframe has the ability to accomplish all tasks that require the particular application, and avoid installing new releases and updates across multiple mainframes with each upgrade, update, bug-fix or new product, and pay differently for each application based on the processing capacity of the mainframe. In accordance with another embodiment, peak MSU consumption of one or more mainframes may be reduced by dynamically shifting work to other mainframes based on time or priority (or both), and/or redirecting execution of particular tasks to a third-party mainframe. Thus, enterprises can reduce cost in instances where they are required to pay for applications that they rarely use by redirecting execution of particular tasks to a third-party mainframe service provider.

Referring to FIG. 1, a block diagram of a system 100 for enhancing the use of mainframe application is illustrated in accordance with a particular non-limiting embodiment of the present disclosure. System 100 includes network 110. Network 110 may be a Local Area Network (LAN), Wireless Local Area Network (WLAN), or a Wide Area Network (WAN). System 100 further includes multiple source mainframes 120A and 120B, and multiple target mainframes 130A, 130B, 130C. In certain embodiments, target mainframe(s) 130 may be located within network 110 (130A and 130B). Source mainframe(s) 120 and target mainframe(s) 130 may communicate with each other over network 110 using appropriate communication protocol (e.g., TCP/IP). In certain embodiments, target mainframe(s) 130 (130C) may be located outside network 110 in a cloud computing environment 140. System 100 further includes users 150A, 150B and 150C. User(s) 150 may communicate with source mainframe(s) 120 or target mainframe(s) 130. In certain embodiments, user(s) 150 may communicate with source mainframe(s) 120 and target mainframe(s) 130 via network 110. In certain other embodiments, user(s) 150 may communicate with source mainframe(s) 120 and target mainframe(s) 130 using cloud computing environment 140.

In some embodiments, source mainframe(s) 120 and target mainframe(s) 130 may be located within the same facility of a particular enterprise. In other embodiments, source mainframe(s) 120 and target mainframe(s) 130 may be located in different facilities managed by the same enterprise, either on the same campus or geographically separated over great distances (e.g., different cities, states or countries) thus requiring network communication with or without using a public network. In other embodiments, target mainframe(s) 130 may be owned and operated by a third-party and available to the owner or operator of source mainframe(s) 120 only using a network (e.g., public Internet).

Source mainframe(s) 120 and target mainframe(s) 130 may be an IBM zSeries mainframe such as IBM z14, IBM z13, or IBM z13s or another mainframe device. Source mainframe(s) 120 and target mainframe(s) 130 may include an operating system. The operating system may be an IBM z/OS operating system or some other mainframe operating system.

Figure 2:
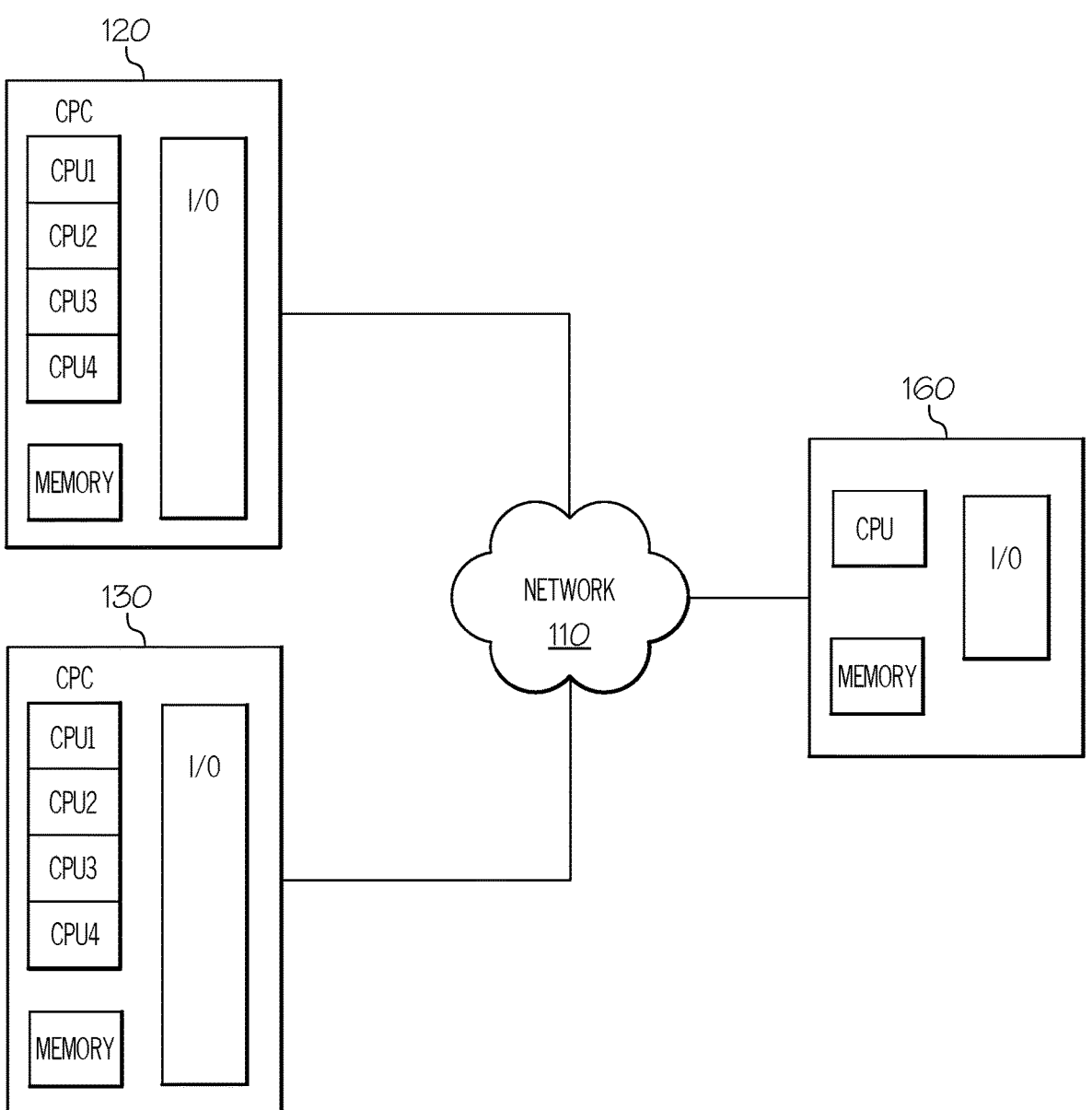
FIG. 2 illustrates a hardware configuration for the manager, the source mainframe, and the target mainframe of a system for enhancing the use of mainframe application in accordance with a particular non-limiting embodiment.

Referring to FIG. 2, a hardware configuration for the manager, the source mainframe, and the target mainframe of a system for enhancing the use of mainframe application in accordance with a particular non-limiting embodiment. Source mainframe(s) 120 and target mainframe(s) 130 may include one or more processors (CPUs) capable of executing one or more executable instructions. The processors in a mainframe may include a plurality of processors managed as central processor complexes (CPCs). Source mainframe(s) 120 and target mainframe(s) 130 may include one or more computer readable storage devices (e.g., memory) that may be volatile memory, non-volatile memory, or a combination of the two. Source mainframe(s) 120 and target mainframe(s) 130 may further include one or more input/ output devices.

Target mainframe(s) 130 may contain applications such as SAS 9.4m5, SAS IT Resources Management, Enterprise Cobol for z/OS, Cobol V4, z/OS XL C/C++, Enterprise PL/I for z/OS, CA Cleanup, CA Easytrieve Report Generator, CA Endevor Software Change Manager, CA Librarian, CA MICS Resource Management, CA Optimizer, CA Optimizer/II, CA Panvalet, IBM Compiler and Library for REXX and Developer for z Systems, or any other applications suitable to execute a task.

In certain embodiments, source mainframe(s) 120 and target mainframe(s) 130 may be logically segmented (LPAR). Each LPAR runs its own copy of a mainframe operating system (e.g., z/OS), and in practice, is equivalent to a separate mainframe. For example, target mainframe(s) 130 may have three LPARs within a single, physical mainframe. These three LPARs run as three separate mainframes. A system administrator can assign one or more processors for the exclusive use of an LPAR, or alternatively, the administrator can allow all processors to be used on some or all LPARs. Furthermore, a user may group two or more LPARs into a capacity group. All LPARs in a capacity group must be on the same physical mainframe.

In certain embodiments, source mainframe(s) 120 and target mainframe(s) 130 may represent one or more SYS-PLEXes. A SYSPLEX is a group of distinct instances (images) of the mainframe operating system (e.g., z/OS). The mainframe operating system images could be running in separate CPCs, or they may be running is separate LPARs within a single CPC, or they could be a combination of both. In short, SYSPLEXes do not need to be located on the same physical mainframe. The SYSPLEXes communicate using a specialized communication component (e.g., XCF).

Referring to FIG. 1, system 100 may include manager 160. Manager 160 may communicate with source mainframe(s) 120 and target mainframe(s) 130 over the network 110 using appropriate communication protocol. In certain embodiments, manager 160 may be in a remote location such as a cloud computing environment 140. In certain embodiments, manager 160 may be located within source mainframe(s) 120 or target mainframe(s) 130. In certain embodiments, manager 160 may be located within user(s) 150. In certain embodiments, manager 160 may be an independent computing device.

In an embodiment in which the manager 160 is co-located with the target system, every unit of work that is processed is managed (monitored) by manager 160 on the target to make sure that it operates correctly and to transmit intermediate results back to the source. These are distinct and separate functions though, so manager 160 may be a built-in part of the target or a separate component that is co-located with the target. In another embodiment, monitoring could easily be separated from the target system's processing . . . for example, if a user wanted a Sysplex-enabled version, one approach would be to run a single "monitor" (e.g., manager 160) for the entire Sysplex.

Manager 160 may monitor the job being executed at source mainframe 120. A job is a separately executable unit of work defined by user 150 and runs on the mainframe. This representation of a unit of work may consist of one task or multiple tasks. Each task may further consist of one step or multiple steps (transactions), where the execution of the step(s) may be required to complete a particular task of the multiple tasks. Manager 160 may monitor a particular task being executed at source mainframe 120. Manager 160 may determine that a particular task requires an application to execute. In response to determining that a particular task requires an application, manager 160 may determine target mainframe(s) 130, located within the network 110 or outside, where the application required to execute the particular task is installed. Manager 160 may validate target mainframe 130. After validating target mainframe 130, manager 160 may redirect the task from source mainframe 120 to target mainframe 130. If there are multiple target mainframes 130 that have the application installed, manager 160 may determine target mainframe 130 with the best available resources and redirect the particular task to that target mainframe 130. Manager 160 may monitor the particular task being executed at target mainframe 130 and determine whether to redirect data from source mainframe 120 to target mainframe 130. Manager 160 may determine whether to return intermediate output data of the particular task being executed at target mainframe 130 to source mainframe 120. Manager 160 may return the results of the particular task from target mainframe 130 to source mainframe 120.

Referring to FIG. 2, manager 160 may include one or more processors (CPUs) capable of executing one or more executable instructions. Manager 160 may also include one or more computer readable storage devices (e.g., memory) that may be volatile memory, non-volatile memory, or a combination of the two. Manager 160 may further include one or more input/output devices Referring to FIG. 3, a flowchart 300 of a method for enhancing the use of mainframe application is illustrated in accordance with a particular non-limiting embodiment of the present disclosure. At step 310, manager 160 may monitor the job being executed at source mainframe 120. The job may be submitted by user 150 for execution or may begin execution based on other predefined conditions, such as time or an event or an instruction from the operator. A job is a separately executable unit of work and runs on the mainframe. This representation of a unit of work may consist of one task or multiple tasks. Each task may further consist of one step or multiple steps (transactions), where the execution of the step(s) may be required to complete a particular task of the multiple tasks.

At step 320, manager 160 may monitor a particular task of the multiple tasks being executed at source mainframe 120. At step 330, while monitoring a particular task, manager 160 may determine whether the particular task requires an application to execute. If it does not, manager 160 may continue to monitor another particular task. If it does, at step 340, manager 160 may determine target mainframe(s) 130 where the application required to execute the particular task is installed. For example, a job may consist of 50 tasks. At step 320 and step 330, manager 160 may monitor task 1 and may determine whether task 1 requires a particular application to execute. Manager 160 may determine that the task 1 does not require a particular application to execute. After making that determination, manager 160 may monitor task 2 at step 320. At step 330, manager 160 may determine that task 2 requires a particular application to execute. Upon making that determination, at step 340, manager 160 may determine target mainframe(s) 130 where the particular application required to execute the task. Target mainframe(s) 130 may be located within network 110 (130A and 130B) or may be located in a could computing environment 140 (130C). In certain embodiments, manager 160 may determine that the particular application required execute a particular task is installed on source mainframe 120. In such embodiments, target mainframe 130 may be source mainframe 120.

Figure 4:
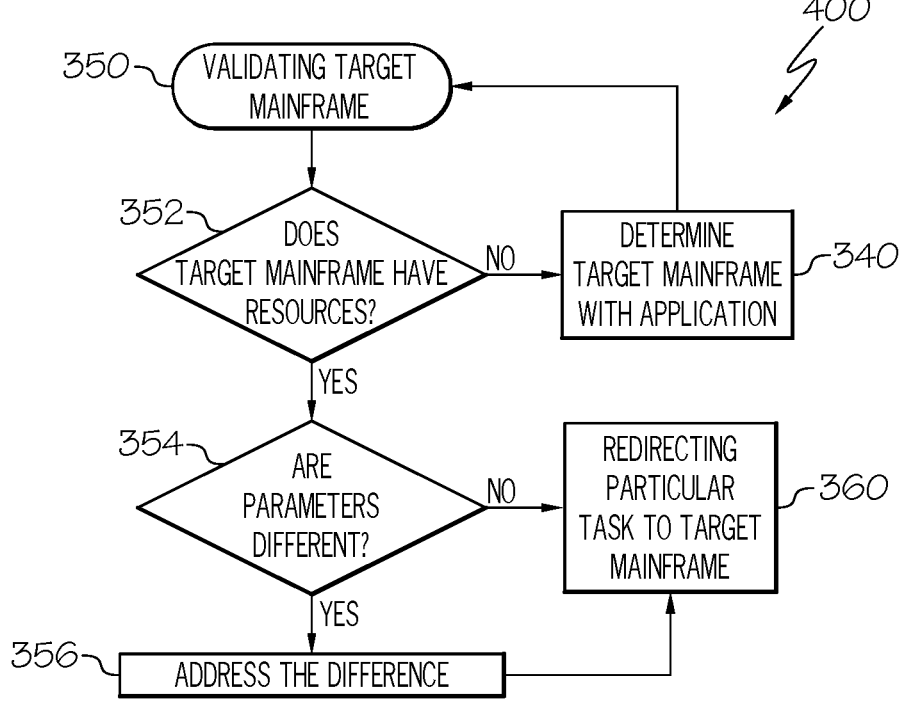
FIG. 4 illustrates a flowchart of a method for validating the target mainframe in accordance with a particular non-limiting embodiment of the present disclosure.

At step 350, manager 160 may validate target mainframe 130 to ensure that a particular task can be accomplished using target mainframe 130. FIG. 4 represents a flowchart 400 of a method for validating the target mainframe in accordance with a particular non-limiting embodiment of the present disclosure. At step 352, manager 160 may determine the resources of target mainframe 130. However, as described above, the monitoring done by manager 160 may be incorporated into the target mainframe, or a separate instance. Resources may include the capacity of target mainframe 130 (e.g., processing capacity, bandwidth, and volatile or non-volatile memory). Processing capacity of the mainframe is often measured in terms of millions of service units per hour (MSUs) that are used to execute the computing task. In certain instances, a customer may obtain a license (e.g., IBM's Monthly License Charge (MLC)) to use processing capacity on source mainframe 120 or target mainframe 130. The processing capacity consumption may be capped by, for example, license agreement or the peak consumption may be pre-defined by the customer in order to limit cost. For example, IBM's MLC expenses are driven by monthly peak in the processing capacity consumption (measured as a 4-hour rolling average (4HRA)). The licensing agreement may cap the 4HRA MSU consumption, or the customer may cap it to limit cost. If the processing capacity consumption reaches cap, the processing capacity of the mainframe is restored only after the processing capacity consumption falls below the cap.

In certain embodiments, at step 352, manager 160 may determine the processing capacity consumption of target mainframe 130, where the application required to execute a particular task is installed. Manager 160 may determine the processing capacity required to execute the particular task. Manager 160 may determine that the processing capacity of target mainframe 130 is about to reach a new "peak" (e.g., predefined peak (e.g., consumption over a certain period of time), new "high" peak for a certain mainframe, new "high"

peak for a certain enterprise (e.g., group of mainframes)) or will reach a new "peak" if the particular task is executed at target mainframe 130. In response, manager 160, in order to avoid a new peak, may return to step 340 to determine a new target mainframe 130 where the application required to execute a particular task is installed.

In certain embodiments, manager 160 may determine that only one target mainframe 130 has the application required to execute the particular task. Manager 160 may further determine that the processing capacity of target mainframe 130 is about to reach a new "peak" or will reach a new "peak" if the particular task is executed at target mainframe 130. Manager 160 may delay the execution of the particular task based on the priority of the particular task (e.g., high priority, medium priority, low priority, etc.) and may execute the particular task when the processing capacity of target mainframe 130 is restored.

In certain embodiment, at step 340, manager 160 may determine multiple target mainframes 130A, 130B, and 130C, where the application required to execute the particular task is installed. Referring to FIG. 4, at step 352, manager 160 may determine the processing capacity of target mainframes 130A, 130B, and 130C. Manager 160 may determine to delay the execution of the particular task or may redirect the particular task to one of the target mainframes 130 based on, for example, processing capacity required to execute any future tasks from the job being executed at source mainframe 120, the applications required to execute any future tasks, target mainframe(s) 130 where the applications required to execute any future tasks is installed, processing capacity to execute the particular task, availability of the processing capacity of target mainframe(s) 130, priority of the particular task, and priority of any future tasks.

Upon determining target mainframe 130 with available resources, at step 354, manager 160 may compare the parameters of target mainframe 130 and source mainframe 120. Parameters may include, for example, security policy, login protocols, job name, executable program name and other file allocation criteria (e.g., file naming standards, name of the file, attributes such as device type the file is to be stored on, management characteristics of the file, etc.) of target mainframe 130 and source mainframe 120. Differences in these parameters from the source mainframe to the target mainframe may prevent the target mainframe from being able to execute a particular task. Other differences in parameters between the source mainframe and the target mainframe may also prevent the target mainframe from executing a particular task. For example, the requested software (e.g., software resident on the source mainframe and needed to execute the task may be part of a commercial software product that is not properly installed or configured on the target mainframe). Otherwise, the organizations may have configured the target mainframe to temporarily or permanently prevent the requested software from being launched using quotas or other restrictions. Moreover, in a cloud deployment, the service provider operating the target mainframe may reject certain clients due to licensing or business policies.

If there is no difference between the parameters of target mainframe 130 and source mainframe 120 (or if it is determined that any difference would not prevent the task from executing properly on the target mainframe, manager 160 may redirect the particular task to target mainframe 130 pursuant to step 360. If there is a difference between the parameters of target mainframe 130 and source mainframe 120 such that the particular task cannot be executed using target mainframe 130, at step 356, manager 160 may configure the parameters. In certain embodiments, manager 160 may configure the parameters of target mainframe 130 such that the parameters of target mainframe 130 will match the parameters of source mainframe 120. In certain embodiments, at step 356, manager 160 may configure the particular task such that the particular task may be executed at target mainframe 130 even if the parameters of target mainframe 130 are different from the parameters of source mainframe 120.

For example, if the file allocation criteria of target mainframe 130 differs from the file allocation criteria of source mainframe 120, the particular task that is sent to target mainframe 130 may be adjusted or reconfigured (e.g., change the file names) such that the particular task may be executed at target mainframe 130. File allocation criteria may include file naming standards, name of the file, attributes such as device type the file is to be stored on, management characteristics of the file, etc.

In certain embodiments, the security policy of target mainframe 130 may differ from the security policy of source mainframe 120. In such instances, manager 160 may reconfigure the security policy of target mainframe 130 (if possible) or may adjust or reconfigure the particular task that is sent to target mainframe 130 such that target mainframe 130 may execute the particular task. Security policy for target mainframe 130 and source mainframe 120 may be user defined. However, security policies tend to be difficult or impossible to adjust or reconfigure, since most organizations won't allow modifications to security policies by third parties or systems.

Mainframes typically have a distinct "security manager" component that make access control decisions according to a customer-defined set of policies, and these tend to differ dramatically from system to system. The idea is that every "resource" (file, program, etc) is accessed in the context of a particular user, and complicated policies let the site decide on the conditions that must exist in order for access to be granted.

One goal of the systems and methods described herein is to provide the exact same security results that would exist if the redirected work was never processed by the manager 160 . . . if the user can access a certain file without manager 160 in the system, the user should be able to access that file with manager 160 in the system, even if his work runs on an entirely different computer. This gets challenging when we file attributes need to be altered (as in an example described above), or when a customer has different security policies on the target system than the customer has on the source system. For example, a particular user "USER1" might have a great deal of access on the source mainframe, but have very little access on the target system.

Generally, where the security policies of the source differ from the target, the task can be performed on the target while maintaining security goals by manipulating one of these things:

1. The user context. On the source system, USER1's work runs as "USER1" (that is, if USER1 logged into the mainframe as USER1). On the target system, manager 160 may propagate the identity USER1, or optionally map USER1 identity to something entirely different. In the example where the source system user "USER1" doesn't have appropriate privileges on the target, "USER1" can be changed to some other user when running on the target (e.g., USER2), and that secondary user would have whatever privileges are needed. This makes it easy to do role-based resource checking . . . a bunch of different users can be mapped to a "VZC submitters" role ID and granted generic privileges that let them do their work without having to grant their source-side IDs privileges on the target system.

2. Where the resource checking occurs—source or target. Typically, manager 160 will redirect the resource checks that the operating system performs back to the source system for execution. If the target system's execution of a particular task opens a file and triggers a security event, manager 160 may also do something to force that same security event to happen on the source. This ensures that all the normal security checks the customer expects still in fact occur (important for auditing and so forth).

3. Trust relationships. In most environments, the source system is the "system of record" with regard to security checking, but sometimes—especially when there's a service provider involved—the target system doesn't "trust" the source system and thus wants to perform its own distinct security checking. The teachings of this disclosure allow for this, and it gives the customer/user the ability to have "do whatever the source system allows" or "both the source and target have to agree" as configuration options. There's also an overall blanket security control for the manager 160 software itself, so that the customer need not give manager 160 software complete access to the customer's entire system and can configure security policies that specifically apply to manager 160.

As noted above, security policies may include file naming standards, name of the file, attributes such as device type the file is to be stored on, management characteristics of the file, etc.

For example, Sites often impose strict naming conventions on files ("all files must have a name beginning with your user ID")—it's commonly the case that a given file name is acceptable on one system (e.g., source mainframe), but not on another (e.g., target mainframe). File attributes, such as the type of device, quantity of space needed, block sizes, performance criteria (so-called "striping") and so forth also differ from one system to another. Management characteristics include things like how long the file will be retained after creation, whether it is automatically backed up or replicated to another site for fault tolerance and so on.

A good example would be temporary files that are only to exist internally within a single job step (they commonly hold intermediate results and so on). The user that submits the original job might specify something like:

```
//MYDD    DD    DSN=VINCE.TEMP, DISP= (, PASS)
//              UNIT=VIO,
//              SPACE= (CYL, 10) ,
//              DATACLAS=TEMPFILE,
//              STORCLAS=FASTDISK,
//              MGMTCLAS=SCRATCH
```

The JCL above might allocate a temporary file on a "virtual" disk and assign 10 cylinders of disk space to it. The file's record organization and special features such as encryption or compression are derived from the "DATACLAS" parameter and would be applied to the file this job creates. The type and performance of device and whether it's replicated (etc) are determined by the "STORCLAS" parameters, and the "MGMTCLAS" in this example might tell us that the file is a temporary file that doesn't require backup and can be scratched 24 hours after it's created.

The way these attributes are defined might be completely different on the target system. For instance, the target might have "UNIT=TEMP" instead of "UNIT=VIO" to specify virtual disk work files. And since the device types can be different, 10 cylinders of disk space on the source system might need to be 15 cylinders on the target. When taken together, these might result in a target disk allocation like this:

```
//MYDD    DD   DSN=& & TEMP, DISP= (, PASS)
//             UNIT=TEMP,
//             SPACE= (CYL, (15, 5) ) ,
//             DCB=DSORG=PS,
//             STORCLAS=TEMPDISK,
//             MGMTCLAS=NONE
```

Some of these are simple replacements, but as you can see, some are entirely different ways to get to the intent of the original submitter.

In certain embodiments, the login protocols of target mainframe 130 may differ from the login protocols of source mainframe 120. In such instances, manager 160 may reconfigure the login protocol of target mainframe 130 or may adjust or reconfigure the particular task that is sent to target mainframe 130 such that target mainframe 130 may execute the particular task.

For example, in most deployments, the target system would want to authenticate and control exactly which source systems are able to connect to it. Not doing so would be a security exposure, since any system with network access to a target system could in theory trigger the target to run potentially malicious work. Also, in a context where the source and target are two different entities, there may be additional policies needed to control whether a particular source system is allowed to request work from a given target . . . this is the case with service providers accepting network requests from one client, but not another. To meet these needs, there are a few different controls built into the systems and methods described herein.

Both source and target choose a connection protocol based on the peer (there can be a different one for each network peer . . . this allows maybe "internal" users to have a different level than "external"). Currently, the teachings of the present disclosure would allow for any of the following:

Completely open (that is, no checking at all). This would be used if there's an external facility in place (such as a VPN between source and target).

Open but private: this doesn't authenticate either source or target, but encrypts network traffic using SSL/TLS. This could be used between multiple datacenters in a particular organization, for example.

Server validation: the source system receives an identity sent by the target and uses security policies to control whether the connection can happen.

Client validation: the source system transmits credentials to the target, and the target decides whether to allow the connection.

Mutual validation: a combination of server and client validation (above).

In any of the protocols supporting authentication, there are two different methods that can be used to share credentials:

1. "Standards-based" or "public" uses X.509 digital certificates and digital signatures to share credentials.
2. "Private" authentication uses a credential provided by the server. It can be anything the administrator desired . . . for example, a service provider might encode a site account number or some other unique identifier.

Together, this creates many different combinations of source and target connection protocols, giving the customer fine-grained control over how connections among systems are authenticated.

Once target mainframe 130 is determined and has been validated, at step 360, manager 160 may redirect the particular task to target mainframe 130 for execution.

Figure 3:
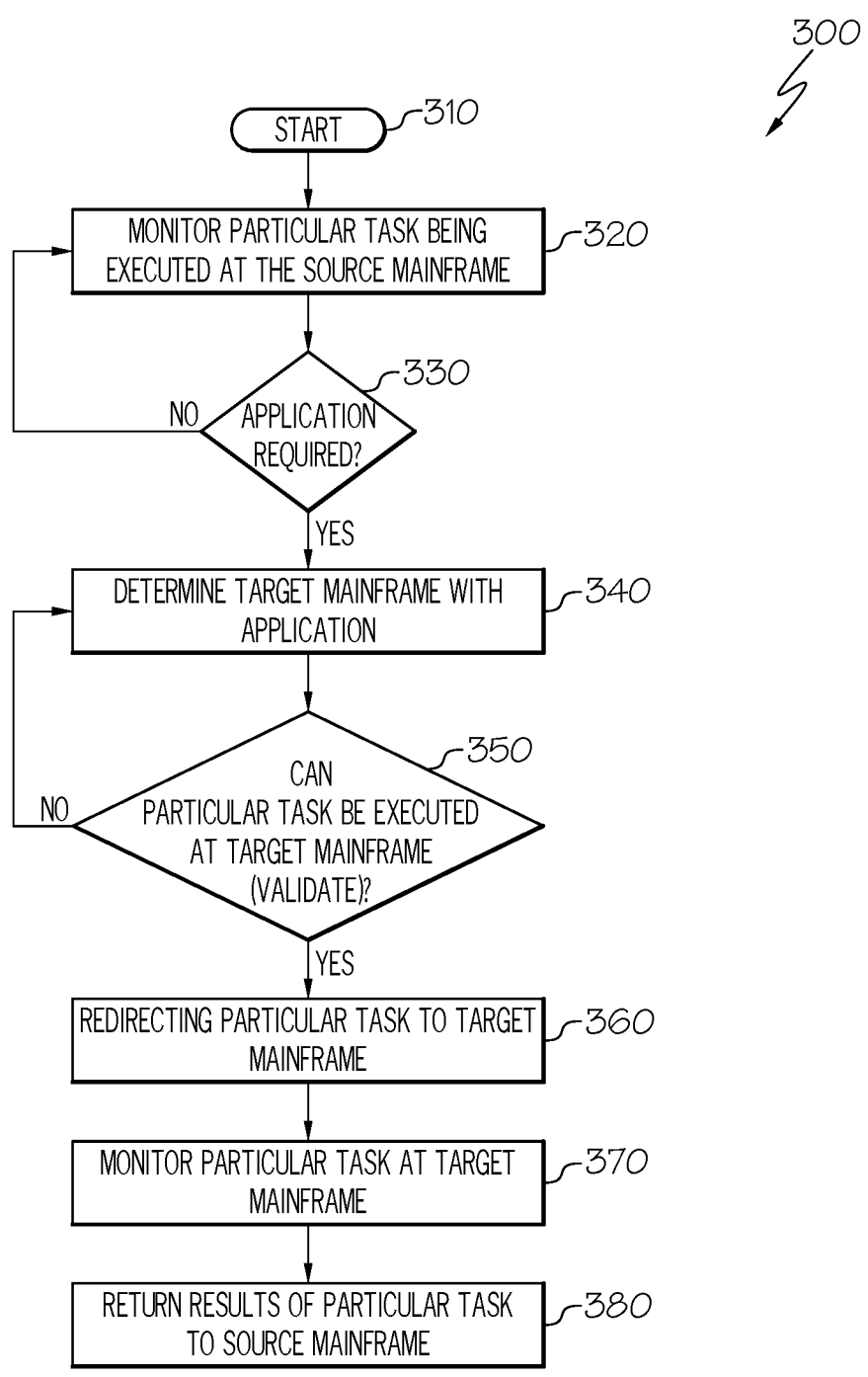
FIG. 3 illustrates a flowchart of a method for enhancing the use of mainframe application in accordance with a particular non-limiting embodiment of the present disclosure.
Figure 5:
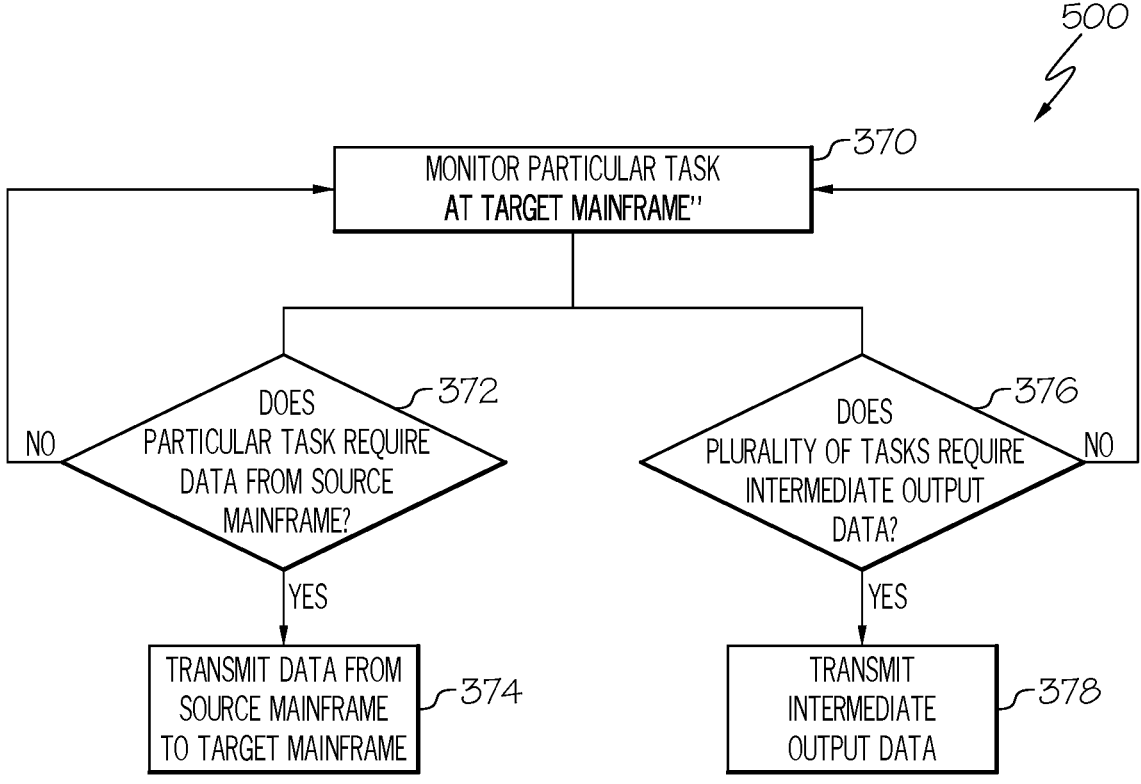
FIG. 5 illustrates a flowchart of a method for monitoring the particular task being executed at the target mainframe in accordance with a particular non-limiting embodiment of the present disclosure.

Referring to FIG. 3, at step 370, manager 160 may monitor the particular task being executed at target mainframe 130. Referring to FIG. 5, a flowchart 500 of a method for monitoring the particular task being executed at the target mainframe in accordance with a particular non-limiting embodiment of the present disclosure. In certain embodiments, the data required for the particular task to be executed at target mainframe 130 may be located at source mainframe 120. For example, a plurality of tasks of multiple tasks may be executed at source mainframe 120 before completion of the execution of the particular task at target mainframe 130. The plurality of tasks may produce output data upon execution. At step 372, manager 160 may determine that the particular task requires access to the output data of at least one of the plurality of tasks in order to execute. In response, at step 374, manager 160 may transmit the output data of at least one of the plurality of tasks to target mainframe 130, in order for the particular task to be completed correctly by target mainframe 130. If at step 372 manager 160 determines that the particular task does not require access to output data of at least one of the plurality of tasks in order to execute, manager 160 may continue to monitor the particular task being executed at target mainframe 130.

In certain embodiments, the plurality of tasks of the multiple tasks being executed at source mainframe 120 may require access to intermediate output data of the particular task being executed at target mainframe 130. Intermediate output data is the output data from the particular task being executed at target mainframe 130 that is generated prior to the completion of the particular task and during the execution of the particular task. At step 370, manager 160 may monitor the particular task being executed at target mainframe 130, including the intermediate output data of the particular task being executed. At step 376, manager 160 may determine that at least one of the plurality of tasks of the multiple tasks being executed at source mainframe 120 requires access to intermediate output data from the particular task being executed at target mainframe 130. In response, at step 378, manager 160 may transmit the intermediate output data of the particular task from target mainframe 130 to source mainframe 120.

Referring to FIG. 3, at step 380, manager 160 may return the results of the particular task from target mainframe 130 to source mainframe 120.

In certain embodiments, the above described method for enhancing the use of mainframe application can be used to redirect or manage particular transactions of multiple transactions of a particular task being executed at source mainframe 120.

The teachings of the present disclosure may be used to reduce the cost of operating a mainframe(s) in one or more of several ways. For example, by employing automated mainframe management techniques similar or identical to those disclosed herein, an enterprise can substantially reduce the cost of operating a mainframe(s) and the resources (e.g., personnel) employed to accomplish these tasks manually. In accordance with particular embodiments, all such management and redirection of mainframe jobs/tasks/transactions can be accomplished on the premises of an enterprise. In accordance with other embodiments, management and redirections of jobs/task/transactions may be accomplished by redirecting some or all of the jobs/tasks/transactions to "the cloud," including but not limited to third-party resources available in the cloud and/or redirecting to resources owned or operated by the enterprise, at a different geographic location than the "source" mainframe.

Management and redirection in certain embodiments may be accomplished through time and priority redirection and acceleration. For example, management techniques and resources may be used to automatically detect that an enterprise resource (e.g., mainframe) is about to reach a new "peak" (e.g., predefined peak (e.g., consumption over a certain period of time), new "high" peak for a certain mainframe, new "high" peak for a certain enterprise (e.g., group of mainframes)). In response, and in order to avoid the new peak, the management system may automatically move work to other resources within the enterprise or to resources in the cloud (of the enterprise, or a third party).

The mainframe management techniques disclosed herein may be used to automatically identify a particular license that is applicable to multiple mainframe and determine whether the application(s) that triggers the license may be consolidated from multiple mainframes to fewer, or even a single mainframe. The savings associated with avoiding unnecessary license redundancy can be substantial.

In particular embodiments of the present disclosure, the teachings may be applied to "batch" oriented products only. For example, application is to products that can be installed once and virtualized as many times as desired within the mainframe(s) and/or enterprise.

The teachings of the present disclosure use automatization and optimization at the program-level to reduce mainframe software licensing fees, while increasing operational efficiency in high-transaction, high complexity mainframe environments. The solutions described herein may be used at the executable level, not just job steps and tasks re-routed or centered on the use of JES or JCL. Using real-time system performance insights, the teachings of the present disclosure may be used to automatically control and prioritize the highest potential and immediate cost savings policies in customer mainframe ecosystems. Enterprises are enabled to use key data to set policies that automatically control redirection. Policies are run on dynamic architecture that can adjust as required to environment needs. The teachings include the ability to centralize licenses on one mainframe, or one LPAR of a mainframe, in order to avoid paying for otherwise redundant licenses.

The teachings of the present disclosure may be employed at the executable level of a mainframe to allow for greater efficiency, savings and flexibility in redirecting tasks to another mainframe. For example, a job to be accomplished by the mainframe may include one or many tasks, and each task may have dozens, hundreds or thousands of steps or "transactions." When a mainframe is assigned a job to complete, it goes through a very complicated and very predictable processes. Since a particular job may take hours to complete, and reliability is the primary key to operating a mainframe, interrupting the processes can be difficult and disruptive.

In the past, when a job was redirected from one mainframe to another (or from one LPAR of a mainframe to another LPAR of the mainframe) an entire job was transferred. The teachings disclosed herein provide an automated system that can monitor transactions of tasks in real-time.

For example, the system may monitor a job or task in real-time to determine when a particular application is "called" to execute a transaction during the running of a task or a job. The job or set of tasks may have hundreds of steps, and the particular application may only be called to execute step 73. The management system disclosed herein may be used to monitor the job or set of tasks in real-time in order to determine when the particular application is called (e.g., at step 73). Upon the determination that step 73 is being called, the system can determine to redirect this step to another mainframe or another LPAR of the mainframe. Before doing so, the management system will determine a target mainframe that has the particular application installed thereon and validate the target mainframe in accordance with the teachings herein.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
   monitoring a job being executed at a source mainframe of an enterprise, wherein the job comprises multiple tasks;

determining that use of the source mainframe is approaching a peak consumption over a period of time;
wherein the peak consumption over the period of time comprises a new high peak consumption over the period of time for the source mainframe or a new high peak consumption over the period of time for the enterprise;
in response to determining that use of the source mainframe is approaching the peak consumption over the period of time, automatically determining an application required to execute a particular task of the multiple tasks being executed at the source mainframe;
identifying a target mainframe having the application installed thereon;
validating an environment of the target mainframe to confirm that the particular task can be executed using the target mainframe;
in response to confirming that the particular task can be accomplished using the target mainframe, redirecting the particular task to the target mainframe for execution;
monitoring the particular task being executed at the target mainframe; and
returning results of the particular task from the target mainframe to the source mainframe.

2. The method of claim 1, wherein validating the environment of the target mainframe comprises:
determining security policies of the target mainframe;
comparing the security policies of the target mainframe with security policies of the source mainframe;
identifying a difference between the security policies of the target mainframe and the security policies of the source mainframe that will negatively impact or prevent the particular task from properly executing on the target mainframe; and
addressing the difference between the security policies of the target mainframe and the security policies of the source mainframe such that the target mainframe can execute the particular task.

3. The method of claim 1, wherein validating the environment of the target mainframe comprises:
determining file naming standards of the target mainframe;
comparing the file naming standards of the target mainframe with file naming standards of the source mainframe;
identifying a difference between the file naming standards of the target mainframe and the file naming standards of the source mainframe that will negatively impact or prevent the particular task from properly executing on the target mainframe; and
reconfiguring the file naming standards such that the target mainframe can execute the particular task.

4. The method of claim 1, wherein validating the environment of the target mainframe comprises:
determining login protocols of the target mainframe;
comparing the login protocols of the target mainframe with login protocols of the source mainframe;
identifying a difference between the login protocols of the target mainframe and the login protocols of the source mainframe that will negatively impact or prevent the particular task from properly executing on the target mainframe; and
adjusting the login protocols such that the target mainframe can execute the particular task.

16

5. The method of claim 1, wherein validating the environment of the target mainframe further comprises:
determining available resources of the target mainframe;
comparing the available resources of the target mainframe to a plurality of resources necessary to accomplish the particular task.

6. The method of claim 1, wherein a plurality of tasks of the multiple tasks are executed by the source mainframe, and further comprising:
determining that the particular task requires access to output data of at least one of the plurality of tasks in order to execute; and
in response to determining that the particular task requires access to the output data of at least one of the plurality of tasks in order to execute, transmitting the output data of the at least one of the plurality of tasks to the target mainframe prior to completing execution of the particular task.

7. The method of claim 1, further comprising:
monitoring intermediate output data of the particular task being executed at the target mainframe, wherein the intermediate output data is output data from the particular task being executed at the target mainframe that is generated prior to completion of the particular task and during the execution of the particular task;
determining that at least one of the plurality of tasks of the multiple tasks being executed at the source mainframe requires access to the intermediate output data of the particular task to execute; and
in response to determining that at least one of the plurality of tasks of the multiple tasks being executed at the source mainframe requires access to intermediate output data of the particular task to execute, transmitting intermediate output data of the particular task from the target mainframe to the source mainframe prior to completing the particular task.

8. A computer configured to access a storage device, the computer comprising:
a processor; and
a non-transitory, computer-readable storage medium storing computer-readable instructions that when executed by the processor cause the computer to perform:
monitoring a job being executed at a source mainframe, wherein the job comprises multiple tasks;
determining that use of the source mainframe is approaching a peak consumption over a period of time;
in response to determining that use of the source mainframe is approaching the peak consumption over the period of time, automatically determining an application required to execute a particular task of the multiple tasks being executed at the source mainframe;
in response to determining that the particular task requires the application, identifying a target mainframe having the application installed thereon;
validating an environment of the target mainframe to confirm that the particular task can be executed using the target mainframe;
in response to confirming that the particular task can be accomplished using the target mainframe, redirecting the particular task to the target mainframe for execution;
monitoring the particular task being executed at the target mainframe; and
returning results of the particular task from the target mainframe to the source mainframe;

wherein validating the environment of the target mainframe comprises:

determining security policies of the target mainframe;

comparing the security policies of the target mainframe with security policies of the source mainframe;

identifying a difference between the security policies of the target mainframe and the security policies of the source mainframe that will negatively impact or prevent the particular task from properly executing on the target mainframe; and addressing the difference between the security policies of the target mainframe and the security policies of the source mainframe such that the target mainframe can execute the particular task.

9. The computer of claim 8, wherein validating the environment of the target mainframe comprises:

determining file naming standards of the target mainframe;

comparing the file naming standards of the target mainframe with file naming standards of the source mainframe;

identifying a difference between the file naming standards of the target mainframe and the file naming standards of the source mainframe that will negatively impact or prevent the particular task from properly executing on the target mainframe; and reconfiguring the file naming standards such that the target mainframe can execute the particular task.

10. The computer of claim 8, wherein validating the environment of the target mainframe comprises:

determining login protocols of the target mainframe;

comparing the login protocols of the target mainframe with the login protocols of the source mainframe;

identifying a difference between the login protocols of the target mainframe and the login protocols of the source mainframe that will negatively impact or prevent the particular task from properly executing on the target mainframe; and adjusting the login protocols such that the target mainframe can execute the particular task.

11. The computer of claim 8, wherein validating the environment of the target mainframe further comprises:

determining available resources of the target mainframe;

comparing the available resources of the target mainframe to a plurality of resources necessary to accomplish the particular task.

12. The computer of claim 8, wherein a plurality of tasks of the multiple tasks are executed by the source mainframe, and wherein the computer-readable instructions further cause the computer to perform:

determining that the particular task requires access to output data of at least one of the plurality of tasks in order to execute; and in response to determining that the particular task requires access to the output data of at least one of the plurality of tasks in order to execute, transmitting the output data of the at least one of the plurality of tasks to the target mainframe prior to completing execution of the particular task.

13. The computer of claim 8, wherein the computer-readable instructions further cause the computer to perform:

monitoring intermediate output data of the particular task being executed at the target mainframe, wherein the intermediate output data is output data from the particular task being executed at the target mainframe that is generated prior to completion of the particular task and during the execution of the particular task;

determining that at least one of the plurality of tasks of the multiple tasks being executed at the source mainframe requires access to the intermediate output data of the particular task to execute; and in response to determining that at least one of the plurality of tasks of the multiple tasks being executed at the source mainframe requires access to intermediate output data of the particular task to execute, transmitting intermediate output data of the particular task from the target mainframe to the source mainframe prior to completing the particular task.

14. A computer program product comprising:

a computer-readable storage medium having computer-readable program code embodied therewith, the computer-readable program code comprising:

computer-readable program code configured to monitor a job being executed at a source mainframe, wherein the job comprises multiple tasks;

computer-readable program code configured to determine that use of the source mainframe is approaching a peak consumption over a period of time;

computer-readable program code configured to, in response to determining that use of the source mainframe is approaching the peak consumption over the period of time, automatically determining an application required to execute a particular task of the multiple tasks being executed at the source mainframe;

in response to determine that the particular task requires the application, computer-readable program code configured to identify a target mainframe having the application installed thereon;

computer-readable program code configured to validate an environment of the target mainframe to confirm that the particular task can be executed using the target mainframe;

computer-readable program code configured to, in response to confirming that the particular task can be accomplished using the target mainframe, redirect the particular task to the target mainframe for execution;

computer-readable program code configured to monitor the particular task being executed at the target mainframe; and computer-readable program code configured to return results of the particular task from the target mainframe to the source mainframe;

wherein validating the environment of the target mainframe comprises:

determining a job name or executable file name associated with the target mainframe;

comparing the job name or executable file name associated with the target mainframe with a job name or executable file name associated with the source mainframe;

identifying a difference between the job name or executable file name associated with the target mainframe with the job name or executable file name associated with the source mainframe that will negatively impact or prevent the particular task from properly executing on the target mainframe; and reconfiguring the job name or executable file name associated with the target mainframe or the job name or executable file name associated with the source mainframe such that the target mainframe can execute the particular task.

15. The computer program product of claim 14, wherein validating the environment of the target mainframe comprises:

determining security policies of the target mainframe;

comparing the security policies of the target mainframe with security policies of the source mainframe;

identifying a difference between the security policies of the target mainframe and the security policies of the source mainframe that will negatively impact or prevent the particular task from properly executing on the target mainframe; and addressing the difference between the security policies of the target mainframe and the security policies of the source mainframe such that the target mainframe can execute the particular task.

16. The computer program product of claim 14, wherein validating the environment of the target mainframe comprises:

determining login protocols of the target mainframe;

comparing the login protocols of the target mainframe with login protocols of the source mainframe;

identifying a difference between the login protocols of the target mainframe and the login protocols of the source mainframe that will negatively impact or prevent the particular task from properly executing on the target mainframe; and adjusting the login protocols such that the target mainframe can execute the particular task.

17. The computer program product of claim 14, wherein validating the environment of the target mainframe further comprises:

determining available resources of the target mainframe;

comparing the available resources of the target mainframe to a plurality of resources necessary to accomplish the particular task.

18. The computer program product of claim 14, wherein a plurality of tasks of the multiple tasks are executed by the source mainframe, and further comprising:

determining that the particular task requires access to output data of at least one of the plurality of tasks in order to execute; and in response to determining that the particular task requires access to the output data of at least one of the plurality of tasks in order to execute, transmitting the output data of the at least one of the plurality of tasks to the target mainframe prior to completing execution of the particular task.

* * * * *